United States Patent
Harada

(10) Patent No.: US 7,328,846 B2
(45) Date of Patent: Feb. 12, 2008

(54) DISPLAY APPARATUS, LIGHT RECEIVING APPARATUS, COMMUNICATION SYSTEM, AND COMMUNICATION METHOD

(75) Inventor: Tsutomu Harada, Kanagawa (JP)

(73) Assignee: Sony Corporation, Tokyo (JP)

( * ) Notice: Subject to any disclaimer, the term of this patent is extended or adjusted under 35 U.S.C. 154(b) by 275 days.

(21) Appl. No.: 11/142,896

(22) Filed: Jun. 1, 2005

(65) Prior Publication Data
US 2005/0263598 A1 Dec. 1, 2005

(30) Foreign Application Priority Data
Jun. 1, 2004 (JP) .......................... P2004-163591

(51) Int. Cl.
G06K 7/10 (2006.01)
G06K 9/18 (2006.01)
G09G 3/30 (2006.01)

(52) U.S. Cl. ............ 235/459; 235/462.09; 235/462.01; 345/81; 345/76

(58) Field of Classification Search ........... 235/462.01, 235/459, 456, 462.09, 472.01; 382/386; 345/102, 81, 82, 87
See application file for complete search history.

(56) References Cited

U.S. PATENT DOCUMENTS

| | | | | |
|---|---|---|---|---|
| 6,327,395 B1* | 12/2001 | Hecht et al. | ................. | 382/306 |
| 7,190,336 B2* | 3/2007 | Fujisawa | ..................... | 345/81 |
| 2003/0160817 A1* | 8/2003 | Ishida et al. | ................. | 345/738 |
| 2003/0198928 A1* | 10/2003 | Lynch et al. | ................. | 434/317 |
| 2004/0070620 A1* | 4/2004 | Fujisawa | ..................... | 345/764 |
| 2004/0124243 A1* | 7/2004 | Gatto et al. | ................. | 235/487 |
| 2004/0125053 A1* | 7/2004 | Fujisawa | ..................... | 345/76 |
| 2007/0013646 A1* | 1/2007 | Harada | ........................ | 345/102 |

FOREIGN PATENT DOCUMENTS

| | | |
|---|---|---|
| JP | 02-231823 | 9/1990 |
| JP | 07-262302 | 10/1995 |
| JP | 11-272586 | 10/1999 |
| JP | 2002-015274 A | 1/2002 |
| JP | 2004127272 A * | 4/2004 |
| JP | 2005-012818 A | 1/2005 |
| JP | 2005-338922 A | 12/2005 |

* cited by examiner

*Primary Examiner*—Michael G. Lee
*Assistant Examiner*—Thien T Mai
(74) *Attorney, Agent, or Firm*—Wolf, Greenfield & Sacks, P.C.

(57) ABSTRACT

A communication method performed between a display apparatus having a display screen capable of displaying moving pictures and a light receiving apparatus having a light receiving means capable of receiving light by using a two-dimensional dynamic code which is a two-dimensional code changing along the time axis, includes the steps of: configuring the two-dimensional dynamic code so as to include a plurality of symbols, the symbols including a data symbol which is a two-dimensional code expressed with a format for data transmission, and an anchor symbol which is a two-dimensional code expressed with a format for anchor transmission; and displaying the data symbol on the display screen in the display apparatus, along the time axis, while displaying the anchor symbol on the display screen every time the data symbol is displayed once or a plurality of times.

9 Claims, 12 Drawing Sheets

DISPLAY APPARATUS, LIGHT RECEIVING APPARATUS, COMMUNICATION SYSTEM, AND COMMUNICATION METHOD

CROSS REFERENCES TO RELATED APPLICATIONS

The present invention contains subject matter related to Japanese Patent Application JP 2004-163591 filed in the Japanese Patent Office on Jun. 1, 2004, the entire contents of which being incorporated herein by reference.

BACKGROUND OF THE INVENTION

1. Field of the Invention

The present invention relates to a display apparatus including a function to transmit information to other apparatus through a display screen, a light receiving apparatus, a communication system, and a communication method.

2. Description of the Related Art

Traditionally, there have been techniques dealing with barcodes, two-dimensional codes and the like. These techniques are mainly utilized for logistics and the like.

In the techniques using the two-dimensional code, various formats are suggested and utilized. However, since these techniques are all intended for static articles such as printed matters, a usable information capacity is about several K byte at maximum, and it is difficult to deal with high capacity information. Therefore, the applicants of the present invention have suggested a technique for displaying a plurality of two-dimensional codes sequentially and dynamically and detecting the plurality of two-dimensional codes sequentially and dynamically, for example, in Japanese Unexamined Patent Application Publication No. 2004-127272. According to this technique, transmitting high capacity information may be possibly realized.

SUMMARY OF THE INVENTION

However, in the technique of the foregoing Japanese Unexamined Patent Application Publication No. 2004-127272, regarding a method of transmitting information between other information processor, only the conceptual contents as shown in FIG. 7 of Japanese Unexamined Patent Application Publication No. 2004-127272 is suggested, and specific contents are not clarified. Therefore, when transmitting high capacity information is actually performed between other information processor, there is no guarantee that transmitting information can be performed effectively and surely.

As above, in the related art, it has been difficult to transmit high capacity information surely while securing effectiveness, and there is room for improvement.

In view of the foregoing shortcoming, it is desirable to provide a display apparatus, a light receiving apparatus, a communication system, and a communication method capable of transmitting high capacity information surely and effectively through dynamic display and detection of a two-dimensional code.

According to an embodiment of the present invention, there is provided the communication method including the steps of configuring a two-dimensional dynamic code so as to includes a plurality of symbols, the symbols including a data symbol which is a two-dimensional code expressed with a format for data transmission, and an anchor symbol which is a two-dimensional code expressed with a format for anchor transmission; and displaying the data symbols on the display screen in the display apparatus along the time axis, while displaying the anchor symbol on the display screen every time the data symbol is displayed once or a plurality of times. In this case, it is possible that in the light receiving apparatus, the data symbol and the anchor symbol are read by the light receiving means, the anchor symbol is detected therefrom, and a light receiving position in the light receiving means is specified based on the detected anchor symbol. Further, it is possible that the light receiving position in the light receiving means is corrected based on the result of specifying the light receiving position.

According to an embodiment of the present invention, there is provided the display apparatus including: a display screen capable of displaying videos; a generation means for generating a two-dimensional dynamic code including a plurality of symbols, the symbols including a data symbol which is a two-dimensional code expressed with a format for data transmission to the light receiving apparatus, and an anchor symbol which is a two-dimensional code expressed with a format for anchor transmission; and a display control means for sequentially displaying the data symbols in the two-dimensional dynamic code generated by the generation means along the time axis on the display screen, and for displaying the anchor symbol on the display screen every time the data symbol is displayed once or a plurality of times.

According to an embodiment of the present invention, there is provided the light receiving apparatus including: a light receiving means for reading a two-dimensional dynamic code including a plurality of symbols from a display screen of the display apparatus, the symbols including a data symbol which is a two-dimensional code expressed with a format for data transmission, and an anchor symbol which is a two-dimensional code expressed with a format for anchor transmission; and a specifying means for detecting the anchor symbol from the two-dimensional dynamic code read by the light receiving means, and specifying a light receiving position in the light receiving means based on the detected anchor symbol. In this case, it is possible that the specifying means corrects the light receiving position in the light receiving means based on the result of specifying the light receiving position.

According to an embodiment of the present invention, there is provided the communication system wherein a display apparatus includes: a display screen capable of displaying videos; a generation means for generating a two-dimensional dynamic code including a plurality of symbols, the symbols including a data symbol which is a two-dimensional code expressed with a format for data transmission to the light receiving apparatus, and an anchor symbol which is a two-dimensional code expressed with a format for anchor transmission; and a display control means for sequentially displaying the data symbol in the two-dimensional dynamic code generated by the generation means along the time axis on the display screen, and for displaying the anchor symbol on the display screen every time displaying the data symbol once or a plurality of times, and the light receiving apparatus includes: a light receiving means for reading the two-dimensional dynamic code including the plurality of symbols from the display screen of the display apparatus, the symbols including the data symbol and the anchor symbol; and a specifying means for detecting the anchor symbol from the two-dimensional dynamic code read by the light receiving means and specifying a light receiving position in the light receiving means based on the detected anchor symbol.

In the communication method according to the embodiment of the invention, the two-dimensional dynamic code is configured to have the plurality of symbols including the data symbol and the anchor symbol. Further, in the display apparatus, the data symbol is displayed on the display screen along the time axis, and the anchor symbol is displayed on the display screen every time the data symbol is displayed once or a plurality of times.

Here, "two-dimensional dynamic code" means code information composed of a series of two-dimensional codes, which changes along the time axis like a moving picture. Here, "two-dimensional code" means a symbol having static contents at each time point, and the configuration and the meaning contents thereof are previously specified according to a given format. A barcode is a special aspect of the two-dimensional code. Further, "symbol" means an image pattern made by, for example, arranging a plurality of display elements. In general, for example, by setting optical physical quantity such as luminance and color for every display element, a symbol as such an image pattern is formed. Here, "once or a plurality of times" does not necessarily mean the constant number of times. It is possible that each number of times of data symbol displayed between each anchor symbol is different from each other. Further, "correcting the light receiving position" means, for example, a process for registering a new light receiving position of the recent symbol as a reading target position when an actual light receiving position of the symbol is shifted from the reading target position (for example, coordinates of the previously registered light receiving position). If the degree of shift from the reading target position becomes significant, it becomes difficult to accurately read the symbol unless any action is taken. In some cases, symbols may not be read. Therefore, "correcting the light receiving position" is meaningful.

Further, when presence of lack of the anchor symbol is detected in the light receiving apparatus, it is possible to determine the communication quality based on the detection result. Here, "presence of lack" literally means the fact that there is a lacked symbol since the symbol is not read due to position shift from the foregoing determined light receiving position and the like. In addition, "presence of lack" also means an index indicating frequency of the lack. Further, "communication quality" literally means quality in data communication using the two-dimensional dynamic code. For example, as described above, when frequency of the lack of the symbol is high, communication quality can be judged low. On the contrary, when frequency of the lack of the symbol is low, communication quality can be judged high. Further, when the format for anchor transmission is configured so that the anchor symbol includes a plurality of reference elements, the light receiving position in the light receiving means is easily specified based on the light receiving positions of the reference elements in the anchor symbol in the light receiving apparatus. Here, "reference element" means a specific element enabling detection of shift of the light emitting position described above, and is previously set to a given position in the symbol.

Further, when the synchronous symbol and the header symbol are displayed before the data symbol and the anchor symbol are displayed in the display apparatus, and the synchronous symbol and the header symbol are read before the data symbol and the anchor symbol are read in the light receiving apparatus, it is possible in the light receiving apparatus to specify at least one of the start point of the communication by the two-dimensional dynamic code and the light receiving position in the light receiving means based on the read synchronous symbol, or to detect the total number of anchor symbols subsequently displayed in the display apparatus and a data type of the data symbol based on the read header symbol. Here, "the total number of anchor symbols subsequently displayed in the display apparatus" means the total number of the anchor symbols included in the two-dimensional dynamic code showing a group of contents information to be delivered. By detecting such information, an information amount that the two-dimensional dynamic code shows can be previously calculated. Further, "data type of the data symbol" means a data type included in the data symbol such as text data, image data, and audio data.

In the display apparatus according to the embodiment of the invention, the two-dimensional dynamic code configured to have the plurality of symbols including the data symbol and the anchor symbol is generated. The data symbols in the generated two-dimensional dynamic code are sequentially displayed on the display screen along the time axis. The anchor symbol is displayed on the display screen every time the data symbol is displayed once or a plurality of times.

In the light receiving apparatus according to the embodiment of the invention, the two-dimensional dynamic code configured to have the plurality of symbols including the data symbol and the anchor symbol is read from the display screen of the display apparatus. The anchor symbol is detected from the read two-dimensional dynamic code, and the light receiving position in the light receiving means is specified based on the detected anchor symbol. In this case, it is also possible to correct the light receiving position in the light receiving means based on the result of specifying the light receiving position.

In the communication system according to the embodiment of the invention, in the display apparatus, the two-dimensional dynamic code configured to have the plurality of symbols including the data symbol and the anchor symbol is generated, the data symbols in the generated two-dimensional dynamic code are sequentially displayed on the display screen along the time axis, and the anchor symbol is displayed on the display screen every time the data symbol is displayed once or a plurality of times. Meanwhile, in the light receiving apparatus, such two-dimensional dynamic code is read from the display screen of the display apparatus, the anchor symbol is detected from the read two-dimensional dynamic code, and the light receiving position in the light receiving means is specified based on the anchor symbol.

According to the communication method of the embodiment of the invention, the two-dimensional dynamic code is configured to have the plurality of symbols including the data symbol and the anchor symbol, and the anchor symbol is displayed every time the data symbol is displayed once or a plurality of times in the display apparatus. Therefore, high capacity information can be delivered surely and effectively. In particular, when in the light receiving apparatus, the symbols are read, the anchor symbol is detected therefrom, and the light receiving position in the light receiving means is specified based on the anchor symbol, the light receiving position of each symbol can be recognized. Further, when the light receiving position in the light receiving means is corrected based on the result of specifying the light receiving position, in addition that the light receiving position can be recognized, the reading target position can be updated as appropriate. Therefore, information delivery can be more surely and effectively performed.

According to the display apparatus of the embodiment of the invention, the two-dimensional dynamic code configured to have the plurality of symbols including the data symbol and the anchor symbol is generated, and the anchor symbol is displayed every time the data symbol is displayed once or a plurality of times. Therefore, a means for surely and effectively delivering high capacity information can be established.

According to the light receiving apparatus of the embodiment of the invention, the two-dimensional dynamic code is read from the display apparatus, the anchor symbol is detected, and the light receiving position in the light receiving means is specified based on the anchor symbol. Therefore, light receiving position of each symbol can be recognized more accurately. In particular, when the light receiving position is corrected based on the result of specifying the light receiving position, in addition that the light receiving position can be recognized, the reading target position can be updated as appropriate. Therefore, information delivery can be more surely and effectively performed.

According to the communication system of the embodiment of the invention, the display apparatus generates the two-dimensional dynamic code configured to have the plurality of symbols including the data symbol and the anchor symbol, and displays the anchor symbol every time displaying the data symbol once or a plurality of times. Further, the light receiving apparatus reads the two-dimensional dynamic code from the display apparatus, detects the anchor symbol, and specifies the light receiving position in the light receiving means based on the anchor symbol. Therefore, high capacity information can be delivered from the display apparatus to the light receiving apparatus surely and effectively.

Other and further objects, features and advantages of the invention will appear more fully from the following description.

DETAILED DESCRIPTION OF THE PREFERRED EMBODIMENT

A best mode for carrying out the invention (hereinafter simply referred to embodiment) will be hereinafter described in detail with reference to the drawings.

Figure 1:
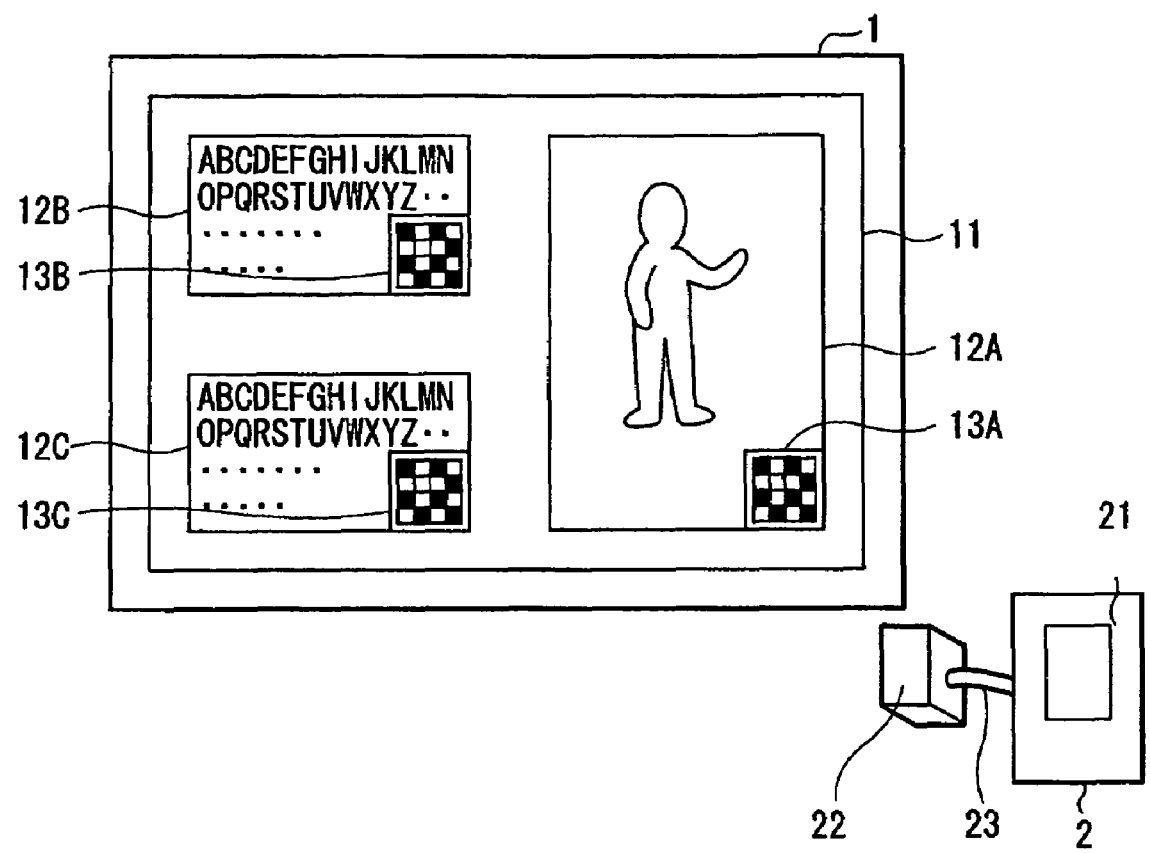
FIG. 1 is a block diagram showing a whole configuration of a communication system according to an embodiment of the invention.

FIG. 1 shows a whole configuration of a communication system according to the embodiment of the invention. The communication system includes a display apparatus 1 having a function to display videos of given figures, texts and the like, and an input terminal 2 having a function to input given information. However, the display apparatus 1 and the input terminal 2 may be configured to have other types of apparatuses (for example, CD (Compact Disc: registered trademark) player, personal computer or the like) as long as these functions are included.

The display apparatus 1 includes a light emitting section 11 including, for example, an organic or inorganic EL (ElectroLuminescence) display, an LCD (Liquid Crystal Display) or the like, in which a plurality of pixels are arranged in the shape of a matrix over the whole area. Further, each pixel in the light emitting section 11 is configured to have a light emitting cell including one light emitting device, and each pixel performs light emitting operation function. As above, by utilizing light emitting operation in each pixel, the after-mentioned two-dimensional dynamic code is displayed, and thereby information can be transmitted by using the light emitting section 11.

The display apparatus 1 concurrently displays, for example, a plurality of windows 12A, 12B, and 12C on the screen, and displays given figures, texts and the like in the window. In FIG. 1, a given figure is displayed in the window 12A, and given texts are displayed in the windows 12B and 12C.

Further, in the respective windows 12A to 12C displayed in the light emitting section 11, symbols 13A to 13C are displayed on the bottom right corner of each window. In these symbols 13A to 13C, for example, a plurality of white or black display elements are arranged in a given region. The black and white pattern can be switched for every frame by the light emitting section 11. These symbols 13A to 13C compose a two-dimensional dynamic code, the two-dimensional code changing along the time axis as described later. Generally, each display element includes a plurality of light emitting cells. Further, the symbols 13A to 13C express various contents data, the information to be transmitted to the input terminal 2 such as information for figures, texts and the like displayed in the respective windows 12A to 12C. By transmitting the contents data to the input terminal 2 by using the two-dimensional dynamic code including these symbols, such contents data can be shared with the input terminal 2.

In FIG. 1, the respective symbols 13A to 13C are displayed on the bottom right corner of the respective windows 12A to 12C. However, the displayed position is not limited thereto, but the respective symbols 13A to 13C can be displayed in a given position in the light emitting section 11. The same is applied to the following figures.

The input terminal 2 includes a display section 21 having, for example, an organic or inorganic EL display, an LCD or the like as in the display apparatus 1, a light receiving section 22 capable of receiving light, a cord 23 for connecting the input terminal body to the light receiving section 22. Further, by reading the two-dimensional dynamic code by utilizing the light receiving section 22, contents data can be received from the display apparatus 1. The display section 21 only has a function to display videos of given figures, texts and the like, and does not have a function to display or read symbols of the two-dimensional dynamic code as the light emitting section 11 and the light receiving section 22 do.

Here, the display apparatus 1 and the input terminal 2 correspond to one specific example of the "display apparatus" and the "light receiving apparatus" in the invention.

Figure 2:
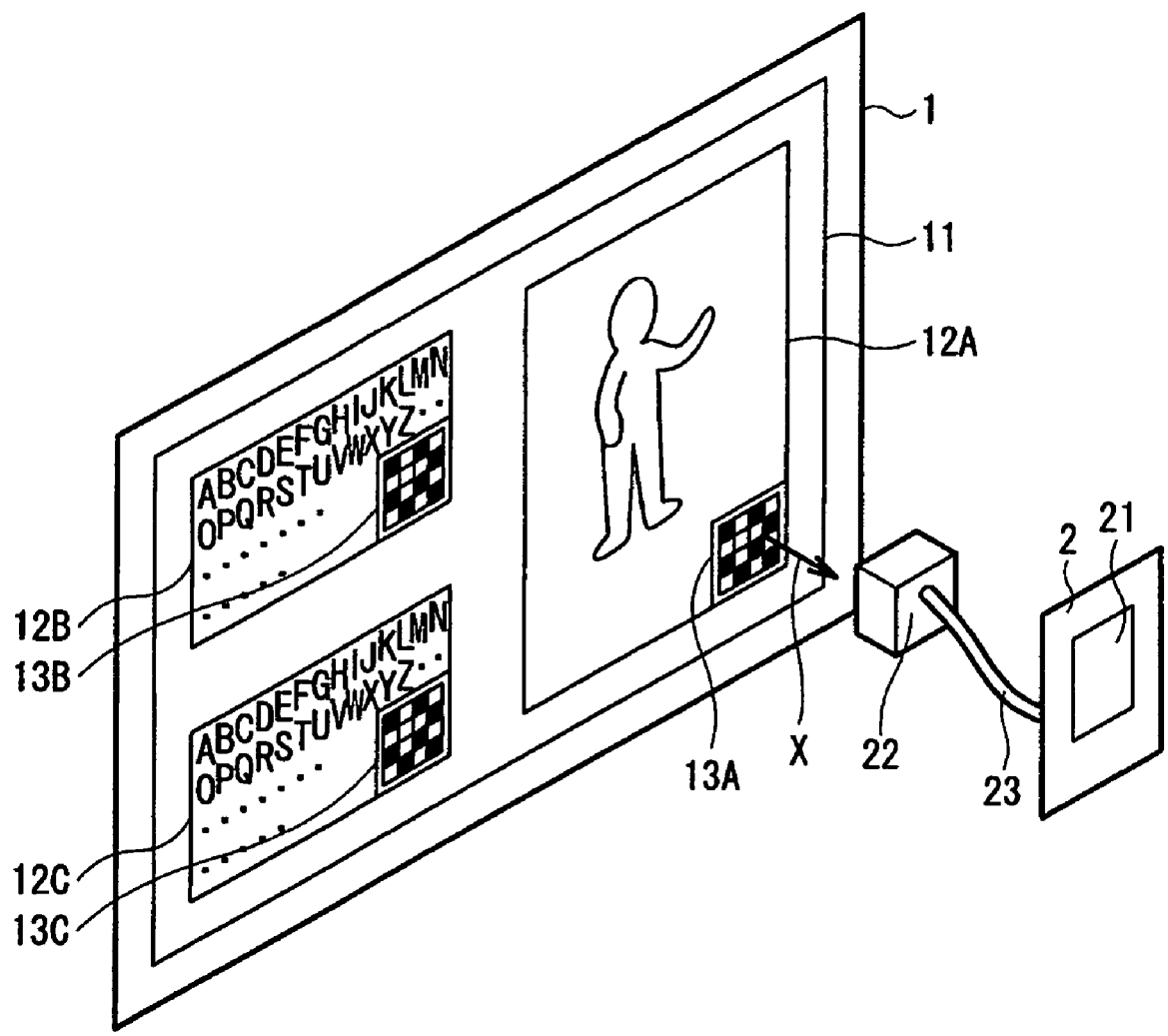
FIG. 2 is an example of a communication situation using a two-dimensional dynamic code in the communication system of FIG. 1.

FIG. 2 shows an example of communication situation using the two-dimensional dynamic code in the communication system of FIG. 1 by a perspective view.

As shown in FIG. 2, for example, a user approximates the light receiving section 22 included in the input terminal 2 to the vicinity of the region of the symbol 13A displayed in the light emitting section 11 included in the display apparatus 1, and thereby contents data can be intuitively received through the symbol 13A as indicated by arrow X. Thereby, various contents data can be easily shared between the display apparatus 1 and the input terminal 2. Specifically, for example, by transmitting contents data from the display apparatus 1 to the input terminal 2 through the symbol 13A, the contents data displayed in the window 12A, in which the symbol 13A thereof is placed can be displayed on the display section 21 of the input terminal 2.

Figure 3:
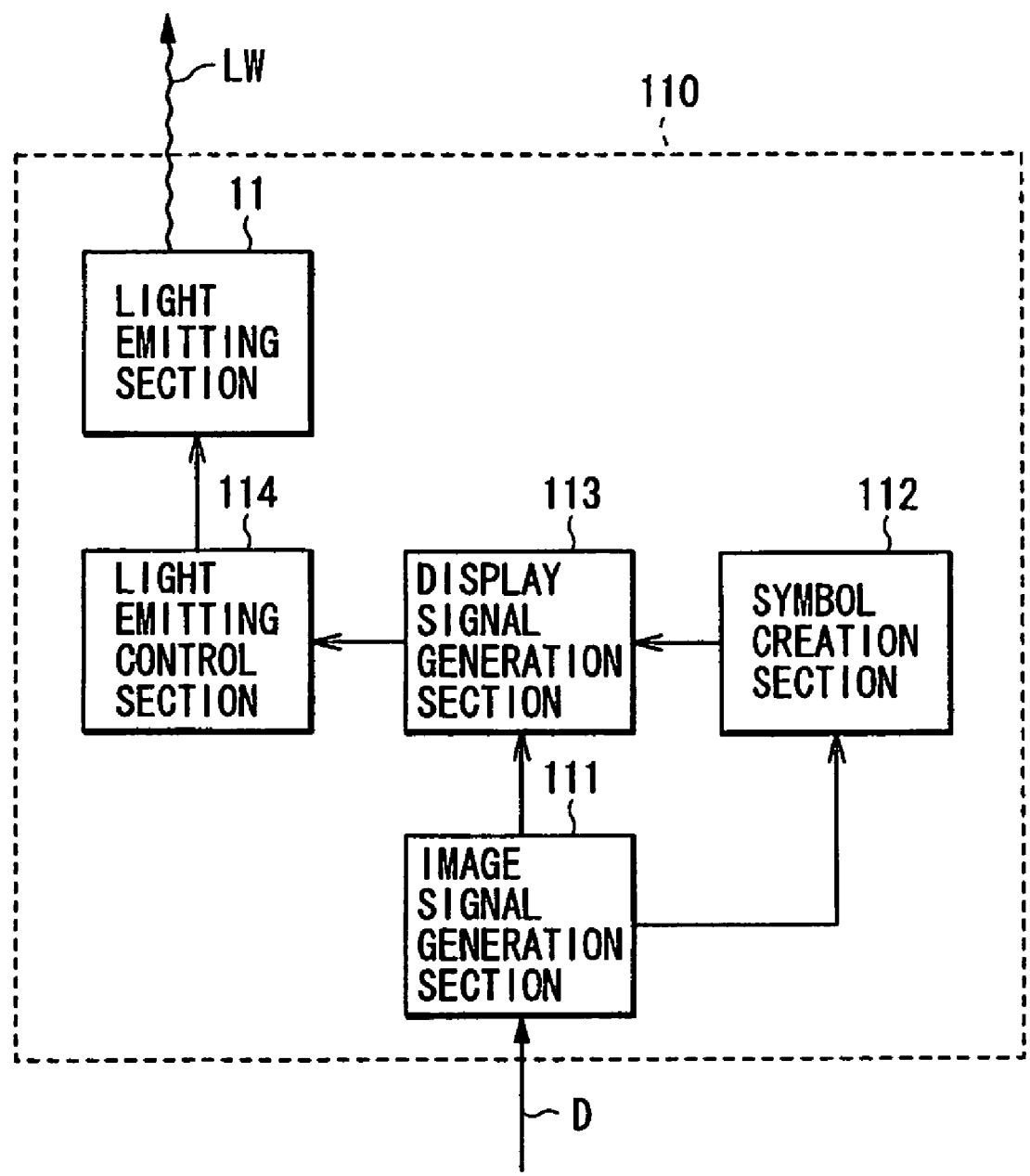
FIG. 3 is a block diagram showing an example of a functional configuration in a display apparatus of FIG. 1.

FIG. 3 shows an example of a functional configuration in the display apparatus 1 of FIG. 1. The display apparatus 1 includes a transmission function section 110 having a function to transmit contents data using the two-dimensional dynamic code. Further, an unshown control section controls the transmission function section 110.

The transmission function section 110 has an image signal generation section 111, a symbol creation section 112, a display signal generation section 113, a light emitting control section 114, and the light emitting section 11.

The image signal generation section 111 generates image signals for displaying, for example, for every screen (every frame to be displayed) based on various contents data D provided from, for example, an unshown TV tuner, a network connection section or the like. The image signal for every screen generated as above is output to the symbol creation section 112 and the display signal generation section 113.

The symbol creation section 112, for example, creates a symbol for every screen composing the two-dimensional dynamic code based on the image signal for every screen output from the image signal generation section 111. Specifically, for example, the image signal is divided into data for every symbol, to which header information included in the two-dimensional dynamic code (information included in the after-mentioned header symbol), calculated values of CRC (Cyclic Redundancy Check) and the like are added, and the symbol for every screen is created. Then, the created symbol for every screen is output to the display signal generation section 113.

A pattern of the symbol created as above is not necessarily different for every frame. It is possible that one symbol pattern exists for several frames. In this case, the same symbol pattern is to be displayed for several frames. The symbol pattern number of per 1 sec will be hereinafter shown in units of "symbols/sec."

The display signal generation section 113 synthesizes the image signal for every screen output from the image signal generation section 111 and the symbol for every screen output from the symbol creation section 112, and generates a display signal for every screen to be displayed in the light emitting section 11. The display signal for one screen generated as above is output to the light emitting control section 114.

The light emitting control section 114 performs drive operation for displaying contents data and each symbol of the two-dimensional dynamic code corresponding to the display signal in the light emitting section 11 based on the display signal output from the display signal generation section 113. Specifically, for example, in the case of linear sequential drive operation generally used, the light emitting control section 114 includes a gate driver, a data driver and the like. A selection signal for selecting each pixel for one horizontal line is provided from the gate driver to the light emitting section 11, and at the same time a display signal is provided from the data driver to each pixel for one horizontal line of the light emitting section 11. By performing such linear sequential drive operation over the whole horizontal lines of the light emitting section 11, contents data and each symbol of the two-dimensional dynamic code corresponding to the display signal can be displayed in the light emitting section 11.

The light emitting section 11 displays contents data and each symbol of the two-dimensional dynamic code corresponding to the display signal by, for example, linear sequential drive operation as described above. As above, the light emitting section 11 displays both various contents data themselves and each symbol of the two-dimensional dynamic code created based on the contents data, and thereby the contents data can be transmitted to the input terminal 2 through a light emitting ray LW.

Figure 4:
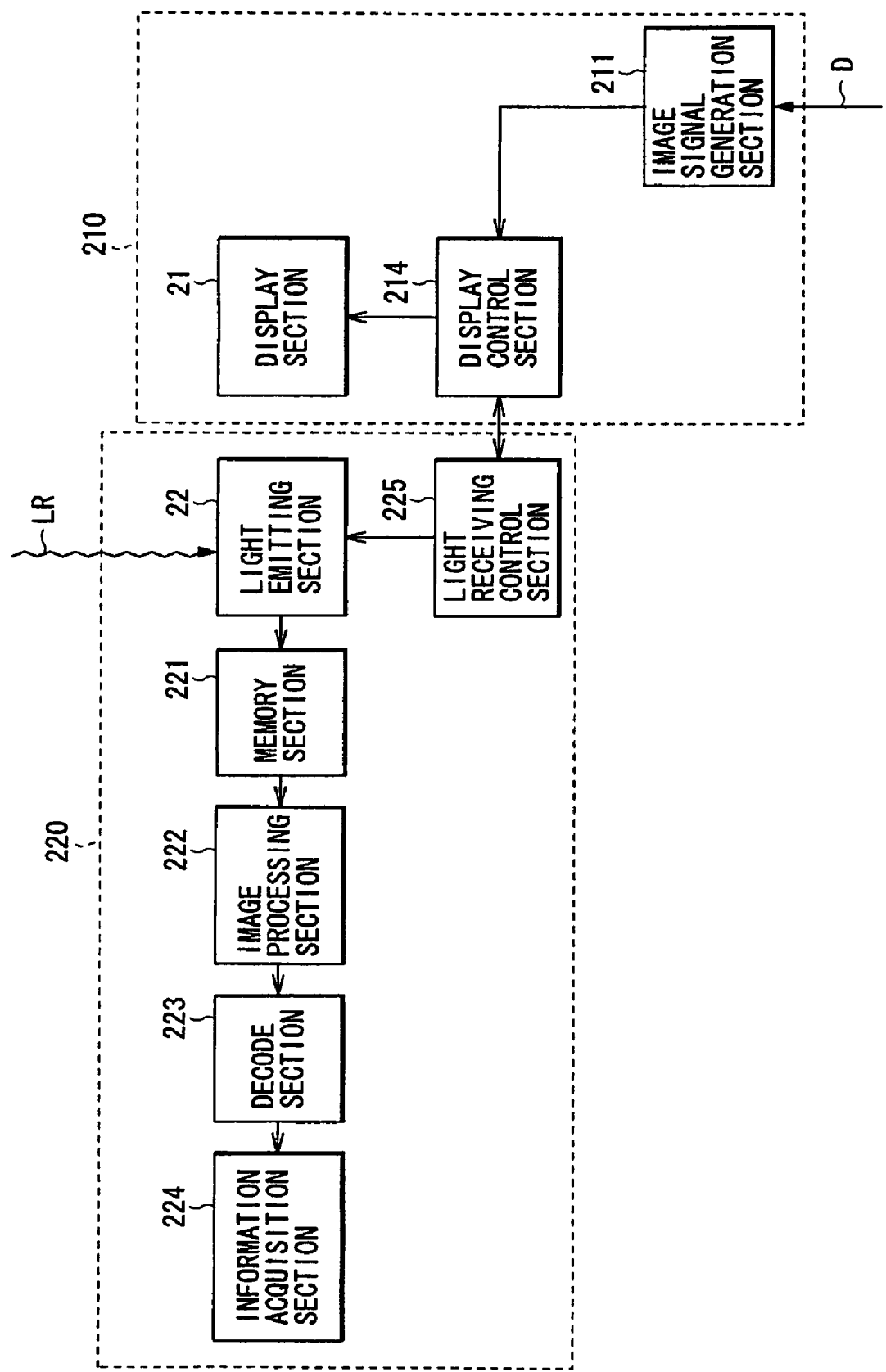
FIG. 4 is a block diagram showing an example of a functional configuration in an input terminal of FIG. 1.

FIG. 4 shows an example of a functional configuration in the input terminal 2 of FIG. 1. The input terminal 2 includes a display function section 210 having only a function to display moving pictures of given figures, texts and the like, and a receiving function section 220 having a function to receive contents data using the two-dimensional dynamic code. Further, the display function section 210 and the receiving function section 220 are controlled by an unshown control section.

The display function section 210 has an image signal generation section 211, a display control section 214, and the display section 21. Meanwhile, the receiving function section 220 has the light receiving section 22, a light receiving control section 225, a memory section 221, an image processing section 222, a decode section 223, and an information acquisition section 224.

First, descriptions will be given of each component of the display function section.

The image signal generation section 211 generates image signals for displaying, for example, for every screen based on various contents data D provided from, for example, an unshown TV tuner, a network connection section or the like. The image signal for every screen generated as above is output to the display control section 214.

The display control section 214 performs drive operation for displaying videos of figures, texts and the like corresponding to the image signal in the display section 21 based on the image signal for every screen output from the image signal generation section 211. Specifically, the drive operation is performed by, for example, linear sequential drive as in the light emitting control section 114 in the display device 1. The display control section 214 may also transmit and receive, for example, control signals to and from the light receiving control section 225 in the receiving function section 220.

As described above, the display section 21 includes for example, an organic or inorganic EL display, an LCD or the like, in which a plurality of pixels are arranged in a state of a matrix over the whole area. The display section 21 displays videos of given figures, texts and the like by, for example, linear sequential drive operation. The display section 21 is similar to the light emitting section 11 of the display apparatus 1, except that the display section 21 only has a function to display videos of given figures, texts and the like.

Next, descriptions will be given of each component of the receiving function section.

The light receiving control section 225 performs drive operation for receiving the two-dimensional dynamic code in the light receiving section 22.

The light receiving section 22 has a function to receive the two-dimensional dynamic code. Specifically, for example, the light receiving section is configured to have a lens, a light receiving device or the like for receiving each symbol of the two-dimensional dynamic code displayed in the light emitting section 11 of the display apparatus 1 as a light receiving ray LR. The light receiving signal received as above is output to the memory section 221.

The memory section 221 reconstructs the light receiving signal output from the light receiving section 22 to a light receiving signal for every screen, and stores and retains the reconstructed light receiving signal in a frame memory composed of, for example, an SRAM (Static Random Access Memory) or the like. The light receiving signal for one screen stored in the memory section 221 is output to the image processing section 222. The memory section 221 may be composed of a memory device other than the memory. For example, data of the light receiving signal can be retained as analog data.

The image processing section 222 performs image processing of the light receiving signal for one screen output from the memory section 221. Specifically, the image processing section 222 extracts each symbol of the two-dimensional dynamic code from the data of the light receiving signal for one screen. As described later, a symbol is extracted by detecting a logo mark or an area for recognition included in each symbol. The data of each symbol of the two-dimensional dynamic code, which is image-processed and extracted as above is output to the decode section 223.

The decode section 223 decodes the data of each symbol of the two-dimensional dynamic code output from the image processing section 222. Specifically, first, CRC is executed based on the data of each symbol. When error correction is necessary in the data in the symbol, error correction of the data in the symbol or error correction of the data of the symbol itself is performed by a given process. Then, such data is to be decoded. Here, if the same symbol has been acquired redundantly, such redundant data is not acquired, or is deleted. As above, the data of each symbol is decoded, and the decoded data is output to the information acquisition section 224.

The information acquisition section 224 accumulates the decoded data output from the decode section, and restores and acquires header information and contents data included in each symbol based on the accumulated decoded data. The header information and contents data restored from each symbol as above are output to the control section (not shown), and process corresponding to such information is executed. Specifically, for example, as described above, it is possible to execute process that the contents data displayed by the apparatus, which transmits such contents data is displayed on the apparatus receiving the contents data.

Next, descriptions will be given in detail of a configuration of the two-dimensional dynamic code in this embodiment.

Figure 5A:
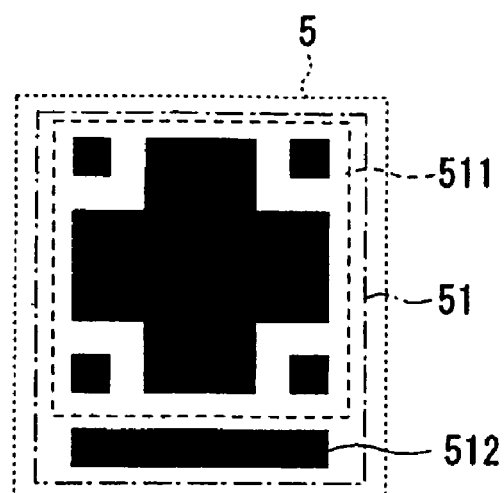
FIGS. 5A, 5B, 5C, and 5D are models showing examples of symbol shapes of the two-dimensional dynamic code.
Figure 5B:
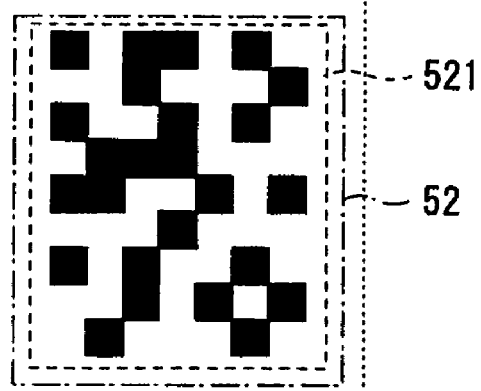
Figure 5C:
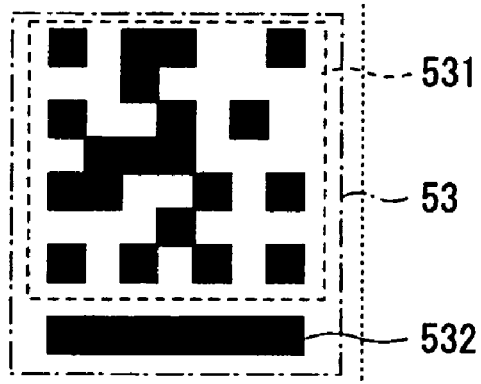
Figure 5D:
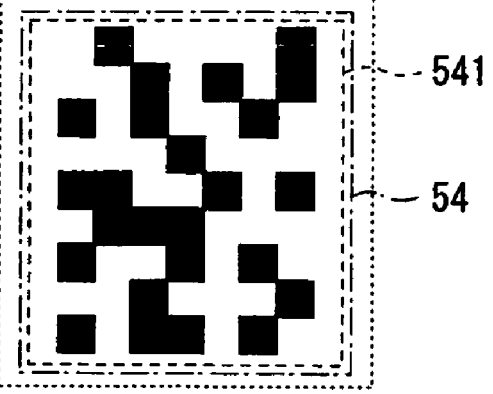

FIGS. 5A, 5B, 5C, and 5D show an example of a shape of a symbol of the two-dimensional dynamic code. A symbol of the two-dimensional dynamic code 5 includes 4 types of symbol shapes. In these figures, FIG. 5A shows a shape of a synchronous symbol 51, FIG. 5B shows a shape of a header symbol 52, FIG. 5C shows a shape of an anchor symbol 53, and FIG. 5D shows a shape of a data symbol 54.

These 4 types of symbols are respectively used for the following purposes. Specifically, the synchronous symbol 51 is used for recognizing that the synchronous symbol 51 is the forehand symbol in the two-dimensional dynamic code, that is, the synchronous symbol 51 is the start point of the data communication by the two-dimensional dynamic code, and for specifying light receiving positions of subsequent respective symbols. The header symbol 52 includes header information, and is used for recognizing such header information. The anchor symbol 53 is used for specifying and correcting light receiving positions of respective data symbols. The data symbol 54 is used for data information.

The shape of the synchronous symbol 51 includes a code section 511, in which the total of 49 dots (7×7) of white or black display elements are arranged, and a logo mark section 512, the rectangular display element, which is arranged under the code section 511. Further, 4 dot regions in the four corners are respectively the areas for recognition described later. Therefore, when the areas for recognition are subtracted from the code section 511 including the total of 49 dots, 33 dots (49−4×4) are obtained. Meanwhile, the logo mark section 512 shows a given logo mark of the two-dimensional dynamic code.

The synchronous symbol 51 is used only for recognizing that the synchronous symbol 51 is the forehand symbol in the two-dimensional dynamic code and for specifying light receiving positions of subsequent respective symbols. Therefore, as the whole symbol, a previously set fixed pattern is typically arranged. A shape of the synchronous symbol 51 is not limited to the shape shown in FIG. 5A, but may be other given shape, as long as it is possible to recognize that the synchronous symbol is the forehand symbol, and specify light receiving positions of respective symbols.

The shape of the header symbol 52 is different from the shape of the synchronous symbol 51 shown in FIG. 5A. The header symbol 52 includes only a code section 521, in which the total of 63 dots (7×9) of white or black display elements are arranged. Further, regarding respective dots in the code section 521, a given black and white pattern is arranged for every symbol. Since there is no area for recognition in the code section 521, the dots for the area for recognition (4×4=16 dots) can be used as a given pattern, and therefore the data capacity thereof is increased compared to of the synchronous symbol 51.

As the shape of the synchronous symbol 51 shown in FIG. 5A, the shape of the anchor symbol 53 includes a code section 531, in which the total of 49 dots (7×7) of white or black display elements are arranged, and a rectangular logo mark section 532, which is arranged under the code section 531. However, regarding respective dots in the code section 531, a given black and white pattern is arranged for every symbol except for the area for recognition. Meanwhile, in the logo mark section 532, a fixed pattern is typically arranged as the shape of the synchronous symbol 51. The area for recognition and the logo mark section 532 as the fixed patterns will be hereinafter referred to as a reference element. As described later, the reference element is utilized for recognizing that the anchor symbol 53 is the anchor symbol and for specifying the light receiving position of the symbol in the light receiving section 22.

As the shape of the header symbol 52 of FIG. 5B, the shape of the data symbol 54 includes only a code section 541, in which the total of 63 dots (7×9) of white or black display elements are arranged. Further, regarding respective dots in the code section 541, a given black and white pattern is arranged for every symbol. As in the shape of the header symbol 52 of FIG. 5B, there is no area for recognition in the code section 541, and the data capacity thereof is increased compared to of the synchronous symbol 51 and the anchor symbol 53.

Figure 6A:
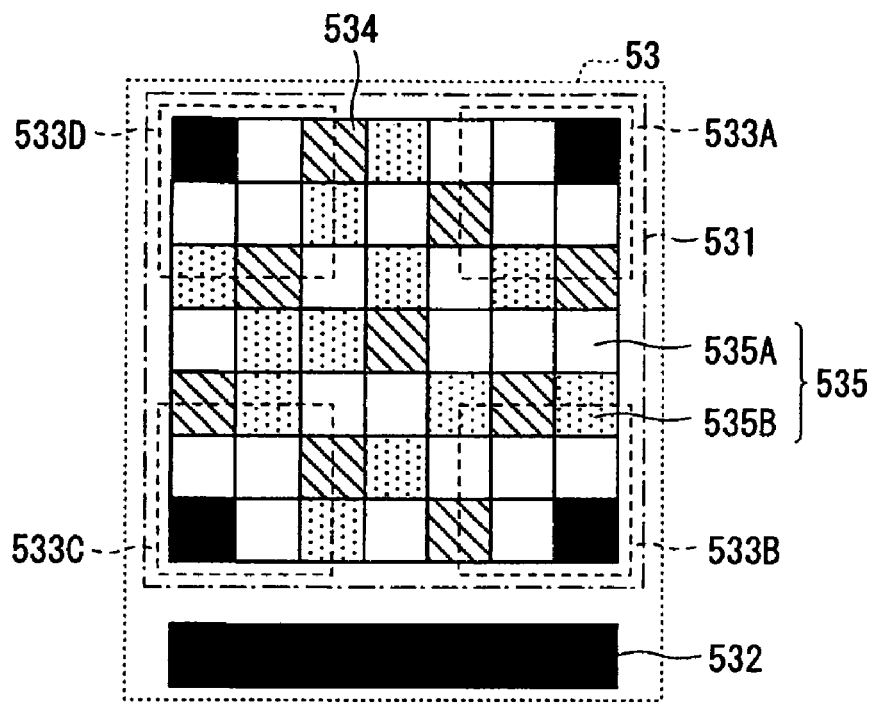
FIGS. 6A and 6B are models showing configurations and functions of each dot in the symbols of FIGS. 5A, 5B, 5C, and 5D.
Figure 6B:
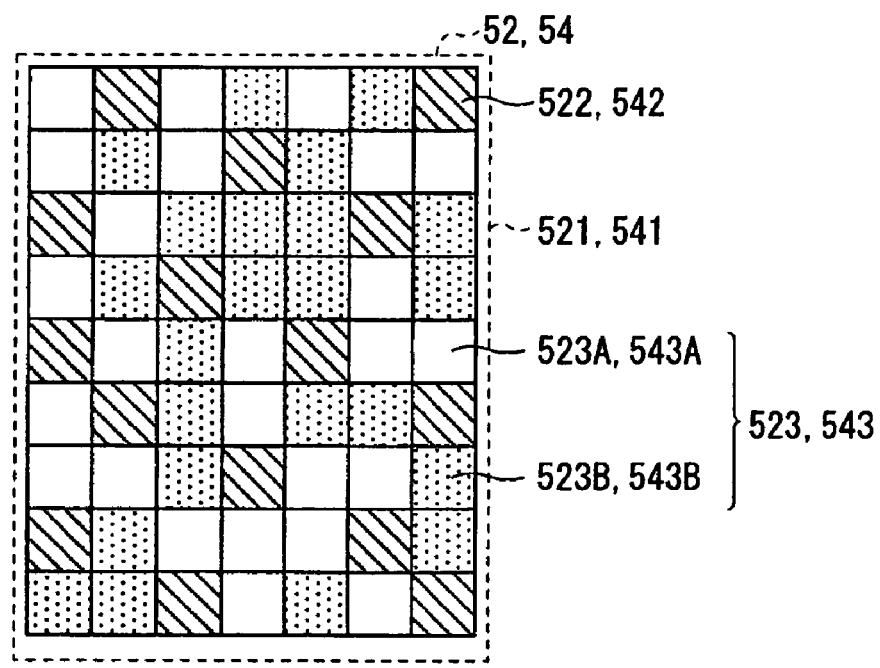

Next, FIGS. 6A and 6B show configurations and functions of respective dots in the symbols of FIGS. 5A, 5B, 5C, and 5D. Of these figures, FIG. 6A shows a configuration and functions of respective dots in the anchor symbol 53, and FIG. 6B shows a configuration and functions of respective dots in the header symbol 52 and the data symbol 54.

The respective 4 dot regions in the four corners in the code section 531 of the anchor symbol 53 are areas for recognition 533A to 533D, respectively as described above. Therefore, of the code section 531 composed of the total of 49 dots, 33 dots (49−4×4=33) can be utilized as a given black and white pattern.

Further, of the 33 dots after excluding the areas for recognition 533A to 533D, 9 dots are utilized for error correction of the data in the symbol as a bit for CRC 534. Therefore, the portion capable of being finally utilized as given data bit 535 is 24 dots (33−9=24). The data bit 535 of 24 dots includes normal rotation data bit 535A of 12 dots, half thereof, and inversion data bit 535B of 12 dots, the other half thereof.

Meanwhile, regarding the code section 521 of the header symbol 52 and the code section 541 of the data symbol 54, of the total of 63 dots, 15 dots are utilized for error correction of the data in the symbol as bit for CRC 522 and bit for CRC 542. Therefore, the portion capable of being utilized as given data bit 523 and 543 is 48 dots (63−15=48). The data bit of 48 dots includes normal rotation data bit 523A and 543A of 24 dots, half thereof, and inversion data bit 523B and 543B of 24 dots, the other half thereof.

FIGS. 7A, 7B, 7C, and 7D show examples of data configurations in the symbols of FIGS. 5A, 5B, 5C, and 5D. FIGS. 7A, 7B, 7C, and 7D respectively show a distribution of a data configuration of the region after excluding the area for recognition in the code sections 511, 521, 531, and 541 of the synchronous symbol 51 of FIG. 5A, the header symbol 52 of FIG. 5B, the anchor symbol 53 of FIG. 5C, and the data symbol 54 of FIG. 5D. The regions after excluding the area for recognition of FIGS. 7A to 7D are 33 bits, 63 bits, 33 bits, and 63 bits, respectively as described above.

Further, as described later, in the two-dimensional dynamic code, regarding FIGS. 7A to 7D, the units thereof are 2 symbols, 4 to 8 symbols, 1 symbol, and 1 to 16 symbols, respectively. In order to prevent lack of symbol (after-mentioned symbol error) in transmission and receiving, the synchronous symbol 51 and the header symbol 52 are typically configured so that every 2 same symbols are allocated.

Since the anchor symbol 53 is used only for correcting the light receiving position of the data symbol 54, if symbol lack occurs for the anchor symbol 53, there is no problem fundamentally. As described later, it is possible to determine communication quality by presence or frequency of lack of the anchor symbol 53. Further, lack of the data symbol 54 is to be corrected by using after-mentioned data for correcting symbol error. If correction is not made thereby, the display apparatus 1 is to retransmit a corresponding symbol.

Figure 7A:
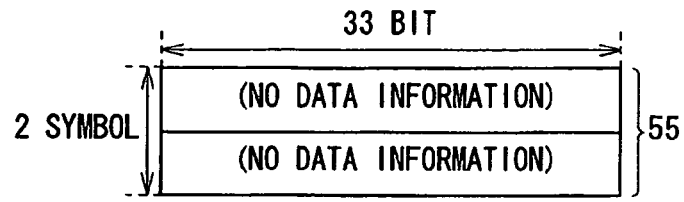
FIGS. 7A, 7B, 7C, and 7D are models showing examples of data configurations of the symbols of FIGS. 5A, 5B, 5C, and 5D.

As shown in FIG. 7A, a data configuration 55 of 33 bits after excluding the area for recognition in the synchronous symbol 51 is only used for recognizing that the synchronous symbol 51 is the forehand symbol in the two-dimensional dynamic code and specifying the light receiving positions of subsequent respective symbols. Therefore, there is no data information therein.

Figure 7B:
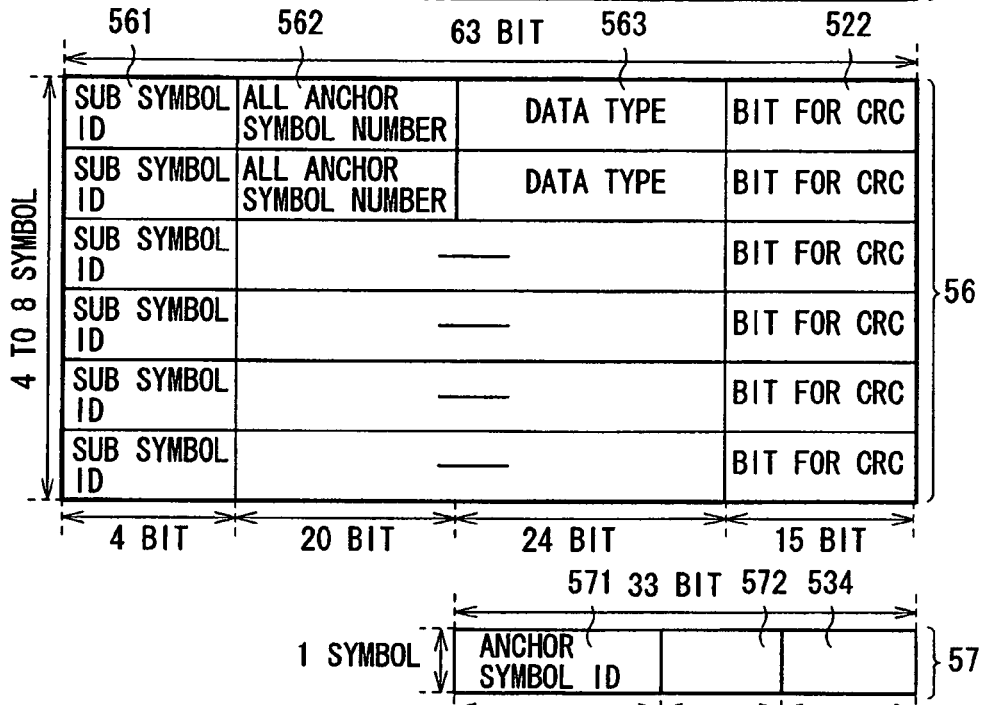

Further, as shown in FIG. 7B, there is no area for recognition in the header symbol 52. Therefore, data of 63 bits can be wholly utilized. A data configuration 56 thereof is as follows. That is, commonly to 4 to 8 symbols, of 63 bits, 4 bits configure a sub symbol ID 561, 15 bits configure the bit for CRC 522 as described above, and remaining 44 bits configure a given data region.

Further, in the first 2 symbols, the given data region further includes all anchor symbol number 562 of 20 bits and a data type 563 of 24 bits. Meanwhile, in the subsequent symbols, the given data region is not defined. Such data region is a region to be specified with the future format, and it is prohibited to voluntarily use such data region.

The sub symbol ID 561 is an identifier for showing an order of symbols in the header symbol 52 (1 to 8 at maximum for 4 bits). Thereby, each symbol in the header symbol can be identified. Further, the bit for CRC 522 is utilized for error correction in the symbol by CRC. The all anchor symbol number 562 shows the total number of the anchor symbol 53 included in the two-dimensional dynamic code. Since 20 bits are allocated, it is possible to define up to 1 M symbols. The data type 563 shows a type of the data included in the data symbol 54.

Figure 7C:
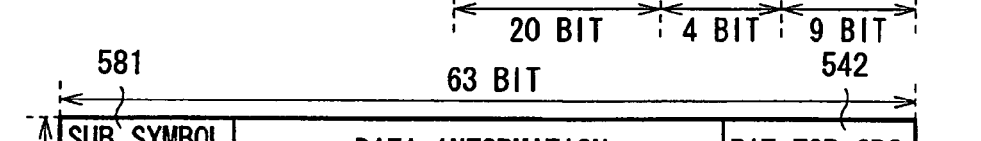

Next, as shown in FIG. 7C, regarding a data configuration 57 of 33 bits after excluding the area for recognition in the anchor symbol 53, 20 bits configure an anchor symbol ID 571, 4 bits configure a sub symbol number of data symbol 572, and remaining 9 bits configure the bit for CRC 534 as described above.

The anchor symbol ID 571 is an identifier for showing the order in the all anchor symbols defined by the foregoing all anchor symbol number 562. By the anchor symbol ID 571 and a sub symbol ID 581 of 4 bits included in the data symbol 54, each data symbol in the two-dimensional dynamic code becomes identifiable. Further, regarding the identifier for each data symbol, two-stage configuration of the anchor symbol ID 571 and the sub symbol ID 581 is adopted. Thereby, it is not necessary that the identifiers are numbered serially according to the all data symbols. Therefore, it is possible to control the bit number of the sub symbol ID 58 to only 4 bits, and more bit number of given data information is secured. In the result, the total amount of transmittable data information is increased, and therefore data information can be effectively transmitted. The bit for CRC 534 is utilized for error correction in the symbol by CRC as described above.

The sub symbol number of data symbol 572 is the sub symbol number included in one set of data symbols (1 to 16 symbols as described above). By the sub symbol number of data symbol 572, the sub symbol number included in the data symbols can be defined. This one set of data symbols will be hereinafter referred to as 1 sector.

Figure 8:
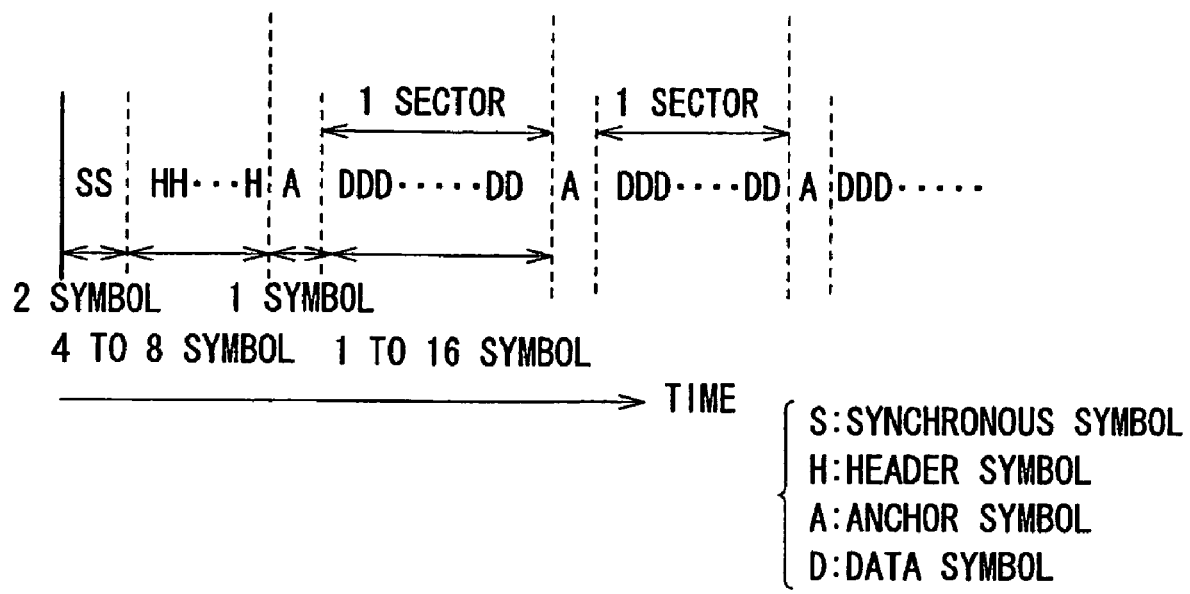
FIG. 8 is a model showing an order configuration of the symbols of the two-dimensional dynamic code.

FIG. 8 shows an order configuration of symbols of the two-dimensional dynamic code. FIG. 8 shows a model of the order configuration of the symbols along the time axis. The synchronous symbol 51 is indicated as S, the header symbol 52 is indicated as H, the anchor symbol 53 is indicated as A, and the data symbol 54 is indicated as D. The order of the symbols of the two-dimensional dynamic code in this format is configured from the start of the two-dimensional dynamic code along the time axis as follows: 2 synchronous symbols, 4 to 8 header symbols, (1 anchor symbol, 1 sector of data symbols), (1 anchor symbol, 1 sector of data symbols) and so forth. That is, configuration is made so that combination of 1 anchor symbol and 1 sector of data symbols is repeated.

Since the order of the symbols is configured as above, it becomes possible to separately set the sub symbol number of the data symbol 54 in units of each sector by the sub symbol number of data symbol 572 included in each anchor symbol 53.

Figure 7D:
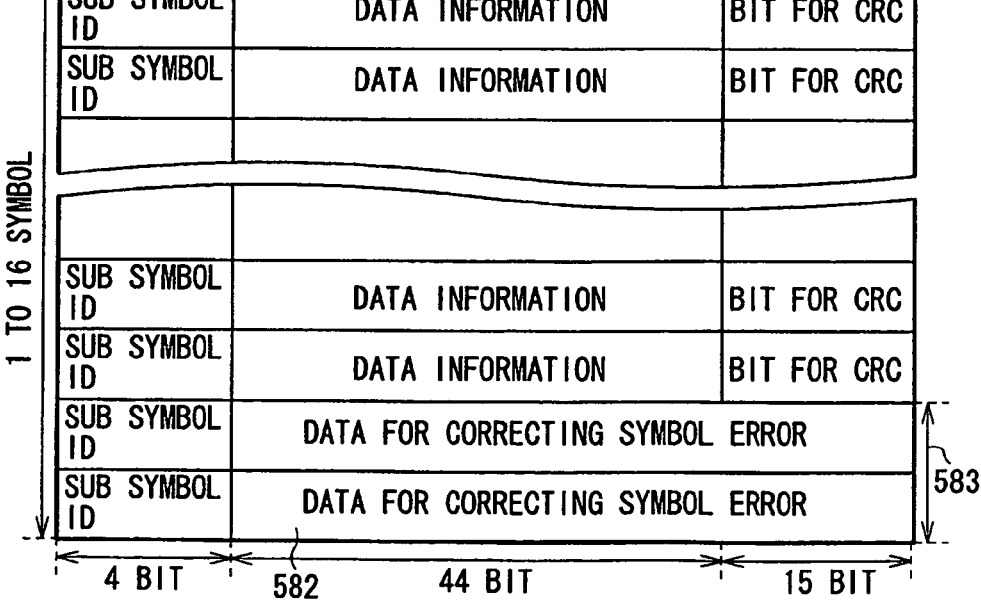

Next, as shown in FIG. 7D, in the data symbol 54, as in the header symbol 52 of FIG. 7B, there is no area for recognition. Therefore, data of 63 bits can be wholly utilized. A data configuration 58 thereof is as follows. That is, commonly to 1 to 16 symbols, of 63 bits, 4 bits configure the sub symbol ID 581, 44 bits configure given data information, and remaining 15 bits configure the bit for CRC 542 as described above.

As 2 symbols indicated by arrow 583 in FIG. 7D, the region of 59 bits after excluding the sub symbol ID of 4 bits may be used as data for correcting symbol error 582. The data for correcting symbol error 582 is data playing a roll for correcting a symbol error when the data symbol itself is lacked during data transmission and receiving using the two-dimensional dynamic code. Therefore, when there is no lack of a data symbol itself during data transmission and receiving, as described above, the data configuration 58 of the data symbol 54 includes the sub symbol ID 581, given data information, and the bit for CRC 542 for all symbols.

The maximum symbol number usable in the two-dimensional dynamic code configured as above is calculated from the all anchor symbol number 562 of 20 bits included in the header symbol 52 and the sub symbol number of data symbol 572 included in the anchor symbol 53 in each sector as described above, and is (2 raised to the 20th power)×(biquadrate of 2)=16 M symbols. Further, the usable maximum data capacity is 16 M symbols×44 bits=about 738 M bits=about 92 M byte if there is no data for correcting symbol error 582 described above, since given data information of 44 bits is secured for each data symbol 54 as described above. Therefore, compared to traditional barcodes and two-dimensional codes (about several K byte at the maximum), significantly high capacity data becomes usable.

Further, for example, where 1 symbol pattern is allocated to 1 frame, and the symbol pattern number per 1 sec is 60 (symbols/sec) with reference to NTSC (National TV Standards Committee) method, the maximum data transfer rate is 60 (symbols/sec)×44 (bit/symbol)×(16/17)=about 2485 bps (bit/sec). (16/17) in the formula means that of 17 symbols, 16 data symbols 54 are included at the maximum per 1 sector (remaining 1 symbol is the anchor symbol 53).

Shapes and data configurations of the symbols of the two-dimensional dynamic code in this embodiment are not limited to the foregoing aspects, but may be other aspects.

Next, transmission and receiving operations of contents data using the two-dimensional dynamic code in the communication system with the configuration as above will be described.

Figure 9:
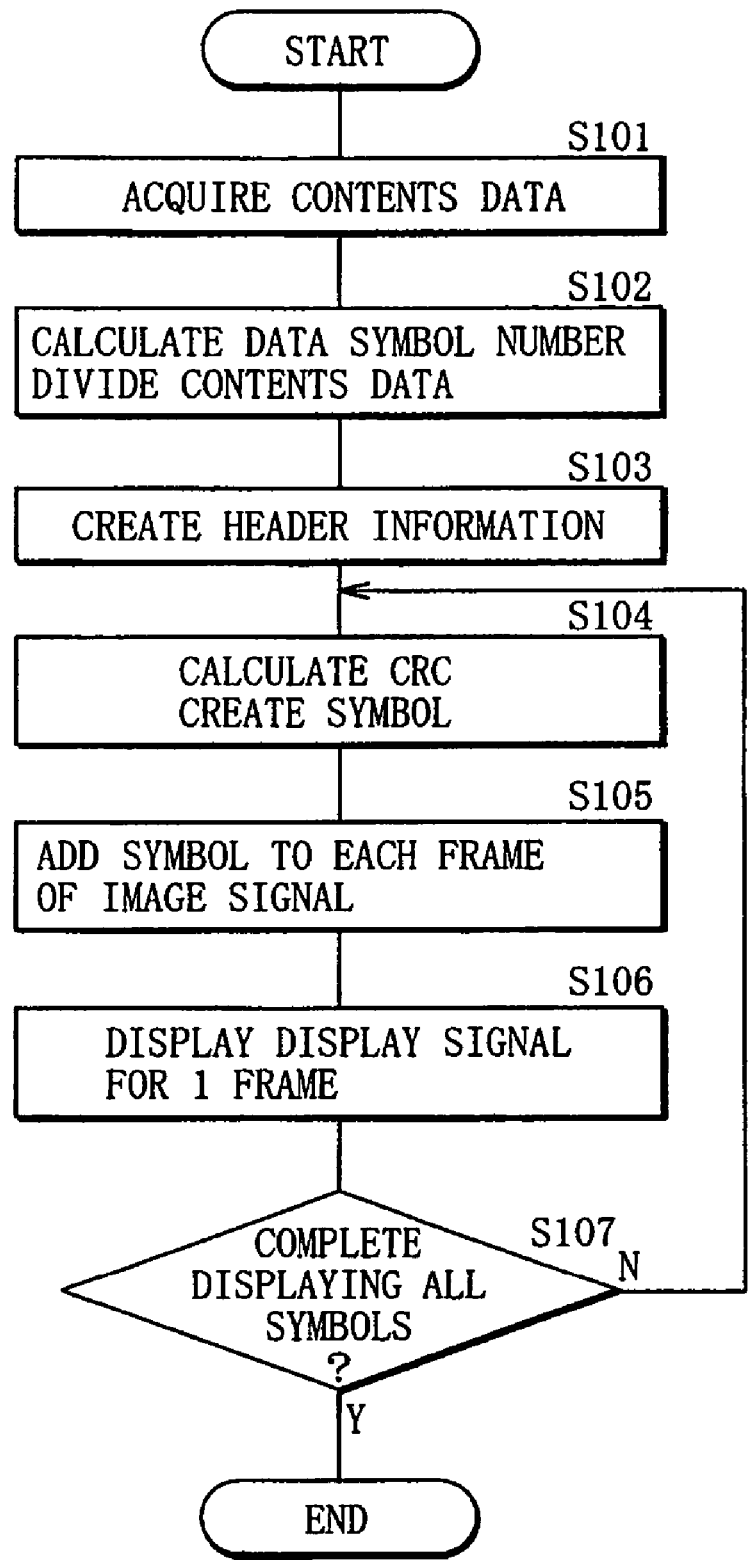
FIG. 9 is a timing diagram of processes that the display apparatus transmits contents data by using the two-dimensional dynamic code in the communication system of FIG. 1.

FIG. 9 shows processes that the display apparatus 1 transmits contents data by using the two-dimensional dynamic code in the communication system of FIG. 1.

First, based on various contents data D provided from an unshown TV tuner or a network connection section, the image signal generation section 111 generates an image signal for 1 screen and outputs the generated image signal to the symbol creation section 112. That is, the symbol creation section 112 acquires contents data for creating each symbol in the two-dimensional dynamic code (Step S101).

Next, the symbol creation section 112 calculates the data symbol number included in the two-dimensional dynamic code, and divides the acquired contents data according to the calculated data symbol number (Step S102). The data symbol number is calculated, for example, according to a data capacity of the contents data and a format of the two-dimensional dynamic code. Specifically, a data capacity of each data symbol is 44 bits, and the data symbol number is calculated based on such data capacity.

The symbol creation section 112 generates header information included in the two-dimensional dynamic code based on the contents data (Step S103). Further, the symbol creation section 112 calculates data for CRC and the like, adds these header information and data for CRC to the contents data, and creates a symbol for every screen (Step S104). The patterns of the symbols created as above are not limited to different patterns for every frame, but it is possible that 1 symbol pattern exists for several frames.

Next, the display signal generation section 113 synthesizes the screen signal for 1 screen output from the image signal generation section 111 and the symbol for every screen output from the symbol creation section 112, and generates a display signal for every screen displayed in the light emitting section 11 (Step S105).

Based on the display signal output from the display signal generation section 113, the light receiving and emitting control section 110 and the light emitting section 11 display images of figures, texts and the like for 1 frame and each symbol of the two-dimensional dynamic code generated in the symbol creation section 112, and transmits the contents data (Step S106). As above, the symbols of the two-dimensional dynamic code are sequentially displayed. Until all symbols included in the two-dimensional dynamic code are completely displayed, the processes of Steps S104 to 106 are repeated. When display is completed, the processes for transmitting contents data by using the two-dimensional dynamic code are ended (Step S107).

Figure 10:
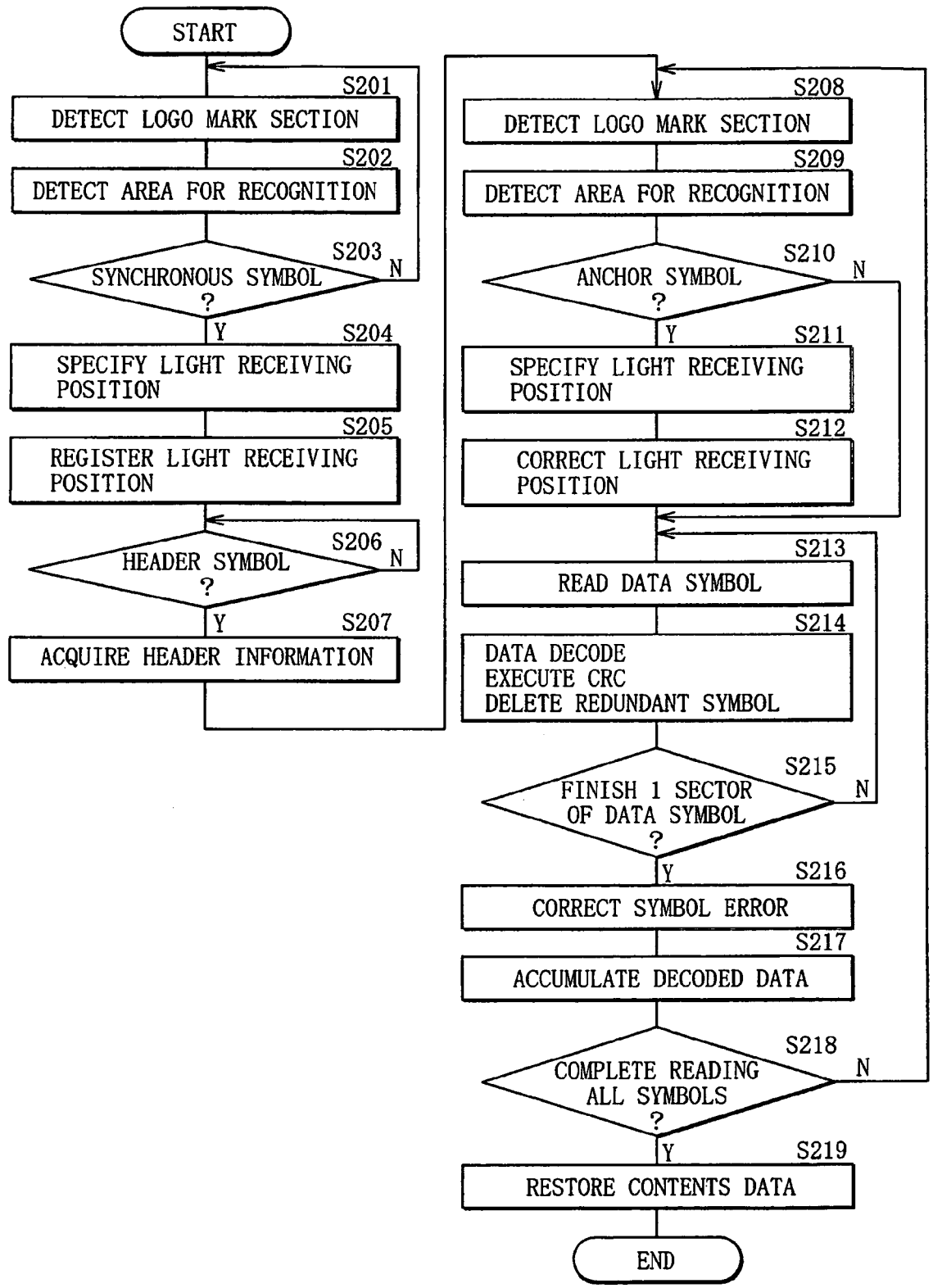
FIG. 10 is a timing diagram of processes that the input terminal receives contents data by using the two-dimensional dynamic code in the communication system of FIG. 1.

Next, FIG. 10 shows processes that the input terminal 2 receives contents data by using the two-dimensional dynamic code in the communication system of FIG. 1.

First, the memory section 221 reconstructs a light receiving signal received by the light receiving section 22 to a light receiving signal for every screen, stores and retains the reconstructed light receiving signal in the frame memory. That is, in the beginning, the light receiving signal is read as above. Then, the image processing section 222 processes the image to extract a symbol of the two-dimensional dynamic code, and thereby whether the read symbol is the synchronous symbol 51 or not is determined. Extraction of the synchronous symbol 51 is performed by firstly detecting the rectangular logo mark section 512 in the shape of the synchronous symbol shown in FIG. 5A from the rectangular shape, the horizontal to vertical length ratio and the like (Step S201), secondly detecting the area for recognition included in the code section 511 from the shape (Step S202), and finally detecting the previously set shape of the whole code section 511. Then, based on these shapes, whether the read symbol is the synchronous symbol 51 or not is determined (Step S203). When the read symbol is not the synchronous symbol 51, the flow returns back to Step S201, and such processes are repeated until the synchronous symbol is read.

If the read symbol is the synchronous symbol 51, the image processing section 222 specifies the light receiving position of the symbol from the shape of the extracted synchronous symbol (Step S204). Thereby, coordinates of the light receiving position in the light receiving section 22 with respect to each dot in the symbol are determined. The input terminal 2 registers the information of the light receiving position (registration of the reading target position of subsequent symbols) (Step S205). As above, it becomes possible that the input terminal 2 surely reads each symbol. Further, since the synchronous symbol 51 is the first symbol in the two-dimensional dynamic code, it is possible to comprehend that the synchronous symbol 51 is the start point of the communication by the two-dimensional dynamic code.

Next, the memory section 221 and the image processing section 222 read the next symbol as in Step S201, and output the extracted symbol to the decode section 223. The decode section 223 performs decode process and executes CRC, and determines whether the read symbol is the header symbol 52 or not (Step S206). When the read symbol is not the header symbol 52, such process is repeated until the header symbol 52 is read.

If the read symbol is the header symbol 52, header information included in the header symbol 52 (all anchor symbol number 562, data type 563 and the like) is acquired (Step S207). The information acquisition section 224 acquires such header information, and thereby such information becomes comprehensible.

Next, the memory section 221 and the image processing section 222 read the next symbol as in Steps S201 to S202. The logo mark section in the shape of the anchor symbol shown in FIG. 5C is detected (Step S208), and the area for recognition in the shape of the anchor symbol shown in FIG. 5C is detected (Step S209), and thereby, that is, from the reference elements, whether this symbol is the anchor symbol 53 or not is determined (Step S210).

If the read symbol is the anchor symbol 53, the image processing section 222 specifies the position to receive the subsequent data symbols 54 from the shape of the detected reference elements (Step S211). Thereby, coordinates of the light receiving position with respect to each dot in the symbols are determined. Then, the input terminal 2 updates the registered information of the light receiving position, and thereby performs correction of the light receiving position (reregistration of the reading target position of the subsequent data symbols) (Step S212).

As above, the input terminal 2 specifies and corrects the light receiving position of the symbol in units of sector. Therefore, the data symbol 54 can be read more surely.

Meanwhile, if the symbol read in Steps S 208 to S 209 is not the anchor symbol 53 (possibly in the case of lack of symbol in reading since only one anchor symbol 53 exists in 1 sector), or if the decode section 223 is not able to recognize that the symbol is the anchor symbol, the symbol position is not rechecked, and the flow is directly forwarded to the next process (reading the data symbol 54). The anchor symbol 53 is only used for specifying and correcting the light receiving position of each symbol. Since such specifying and correcting the light receiving position is performed in units of sector, there is no problem even if the light receiving position is not specified and corrected once. Furthermore, on the contrary, it is possible to determine communication quality of the communication using the two-dimensional dynamic code by presence and frequency of lack of the anchor symbol 53.

Next, the data symbol 54 is read (Step S213), and the decode section 223 performs decode process and executes CRC. Then, the symbol number is checked. When the same symbol is redundantly read, the redundant data is deleted (Step S214). Whether the symbol is redundant or not is determined by, for example, the anchor symbol ID 571 and the sub symbol ID 581.

Next, whether the data symbols 54 of 1 sector are completely read or not is determined (Step S215). If not, the flow is returned back to Step S213, and the next data symbol is read. When reading the data symbols 54 of 1 sector is completed, if symbol error (lack of the data symbol 54 itself in reading) occurs, the symbol error is corrected (Step S216). Regarding a method of correcting symbol error of the data symbol 54, first, correction is made by using the data for correcting symbol error 582. When correction is not thereby made, the display apparatus 1 is to retransmit corresponding data symbol.

Whether the data symbols 54 of 1 sector are completely read or not is determined by the sub symbol ID 581 and the sub symbol number 572 of the data symbol included in each anchor symbol for every sector.

Next, the information acquisition section 224 accumulates decoded data (Step S217), and determines whether all symbols are completely read or not (Step S218). If not, the flow is returned back to step S205, and a light receiving signal of the anchor symbol 53 of the next sector is acquired. If reading is completed, the information acquisition section 224 restores and acquires the contents data (Step S219). Thereby, the processes for receiving contents data by using the two-dimensional dynamic code are ended.

As described above, according to the display apparatus, the light receiving apparatus, the communication system, and the communication method of this embodiment, the display apparatus 1 includes the light emitting section 11 capable of displaying videos, and the input terminal 2 includes a light receiving section 22 capable of receiving light. Further, the two-dimensional dynamic code is configured to have a plurality of symbols including the data symbol 54 and the anchor symbol 53, and the display apparatus 1 displays the anchor symbol 53 every time that the display apparatus 1 displays the data symbol 54 once or several times (every sector) by utilizing the light emitting section 11. Therefore, by adopting two-stage configuration of the anchor symbol ID 571 and the sub symbol ID 581 regarding an identifier of each data symbol, it is not necessary to give identifiers serial numbers according to all data symbols, and high capacity information can be effectively delivered from the display apparatus 1 to the input terminal 2.

Further, the input terminal 2 reads the symbols by utilizing the light receiving section 22, detects the anchor symbol 53 therefrom, specifies the light receiving position of each symbol in the light receiving section 22 based on the anchor symbol, and further corrects the light receiving position. Therefore, the light receiving position of the symbol can be corrected in units of sector, and high capacity information can be surely delivered.

Further, in the display apparatus, the light receiving apparatus, the communication system, and the communication method of this embodiment, presence of lack of the anchor symbol 53 is detected in the input terminal 2. Therefore, based on the detection result, communication quality of the communication using the two-dimensional dynamic code can be determined.

Further, according to the display apparatus, the light receiving apparatus, the communication system, and the communication method of this embodiment, the two-dimensional dynamic code further includes the synchronous symbol 53, the two-dimensional code expressed with the format for synchronization, and the header symbol 54, the two-dimensional code expressed with the format for header. Further, before starting to display the data symbol 54 and the anchor symbol 53, the display apparatus 1 displays the synchronous symbol 51 and the header symbol 52. Further, before starting to read the data symbol 54 and the anchor symbol 53, the input terminal 2 reads the synchronous symbol 51 and the header symbol 52. Therefore, the input terminal 2 can specify the start point of the communication by the two-dimensional dynamic code based on the synchronous symbol 51. Further, the input terminal 2 can specify the light receiving position of each symbol subsequently received in the light receiving section 22 based on the previously set shape of synchronous symbol 51.

Descriptions have been hereinbefore given of the invention with reference to the embodiment. However, the invention is not limited to the embodiment, and various modifications may be made. For example, the case, in which the display apparatus 1 is the transmission apparatus side of the contents data and the input terminal 2 is the receiving apparatus side of the contents data has been described. However, on the contrary, the input terminal 2 can be the transmission apparatus side and the display apparatus 1 can be the receiving apparatus side, as long as these devices include functions to receive and transmit contents data using the two-dimensional dynamic code.

Further, the light emitting section 11 included in the display apparatus 1 and the light receiving section 22 included in the input terminal 2 in this embodiment respectively have only the functions to display and read each symbol of the two-dimensional dynamic code as described above. However, for example, as in the after-mentioned modified example, instead of the light emitting section 11 and the light receiving section 22, or in addition to the light emitting section 11 and the light receiving section 22, it is possible that a light receiving and emitting section having both functions to display and read each symbol of the two-dimensional dynamic code is provided to realize transmission and receiving function of contents data using the two-dimensional dynamic code.

[Modified example]

Figure 11:
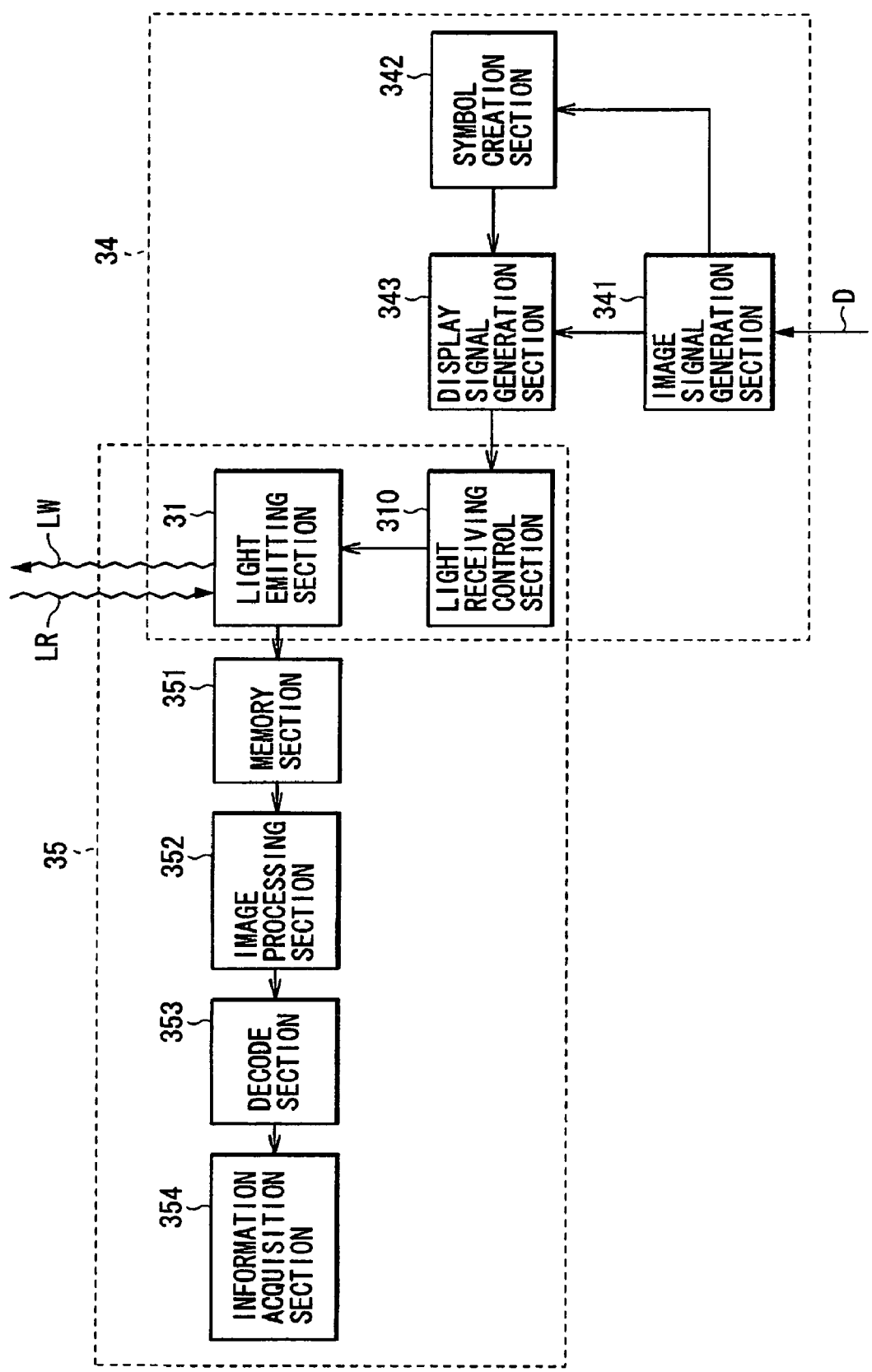
FIG. 11 is a block diagram showing an example of a functional configuration when the display apparatus and the input terminal of FIG. 1 have functions to transmit and receive contents data.

In this case, for example, as shown in FIG. 11, a transmission function section 34 having a function to transmit contents data using the two-dimensional dynamic code, and a receiving function section 35 having a function to receive the contents data using the two-dimensional dynamic code are provided. The above-mentioned light receiving and emitting section 31 and a light receiving and emitting control section 310 for performing drive operation for the light receiving and emitting section 31 are sections common to the transmission function section 34 and the receiving function section 35. These transmission function section 34 and the receiving function section 35 are controlled by an unshown control section. Further, the transmission function section 34 additionally has an image signal generation section 341, a symbol creation section 342, and a display signal generation section 343. The receiving function section 35 additionally has a memory section 351, an image processing section 352, a decode section 353, and an information acquisition section 354.

Each pixel in the light receiving and emitting section 31 is configured to have a light receiving and emitting cell including one light receiving and emitting device. Each pixel has both a light emitting operation function and a light receiving operation function. Further, the light receiving and emitting control section 310 performs light emitting drive operation and also performs light receiving drive operation for the light receiving and emitting section 31. When light emitting operation and light receiving operation in each pixel are utilized as above, and displaying and reading the two-dimensional dynamic code are performed through the light emitting ray LW and the light receiving ray LR as shown in the figure, contents data can be transmitted and received by using the light receiving and emitting section 31.

Figure 12:
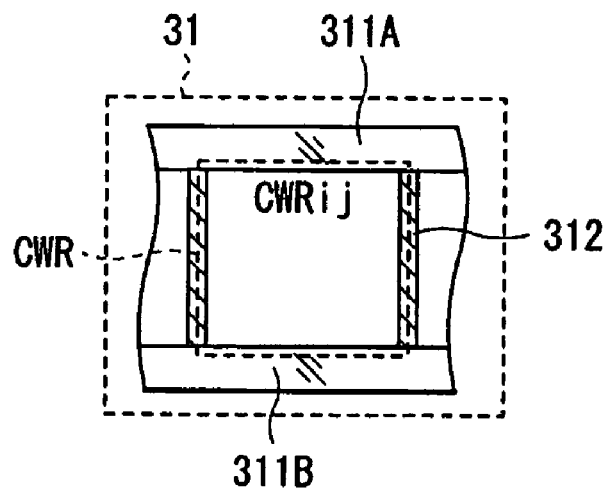
FIG. 12 is a cross section showing a model of an example of an arrangement configuration of a light receiving and emitting cell in a light receiving and emitting section of FIG. 11.

FIG. 12 shows a model of an example of an arrangement configuration of the light receiving and emitting cell in the light receiving and emitting section 31 of FIG. 11 with a cross section. In the example of FIG. 12, the case, in which the light receiving and emitting device included in the light receiving and emitting cell is an organic EL device, and an organic EL layer is provided between a pair of transparent substrates is shown. In FIG. 12, reference symbols i and j indicating the position represent natural numbers.

The light receiving and emitting section 31 has a pair of transparent substrates 311A and 311B, and a plurality of light receiving and emitting cells CWR (CWRij), which is arranged between the transparent substrates 311A and 311B, and separated from each other by a dividing wall 312. Further, in this example, as described above, the light receiving and emitting cell CWR includes the organic EL device as a light receiving and emitting device. Other layers in a general organic EL display are not shown and omitted.

The cross section of the arrangement configuration example of the light receiving and emitting cell CWR in the light receiving and emitting section 31 is not limited to this model, but other arrangement configuration may be adopted. Further, in the example of the cross section shown in FIG. 12, descriptions have been given with reference to the example, in which the light receiving and emitting device EL is composed of the organic EL device. However, the light receiving and emitting device may be other device, as long as the device includes a light emitting function and a light receiving function. Further, a light emitting device and a light receiving device may be provided separately.

Figure 13:
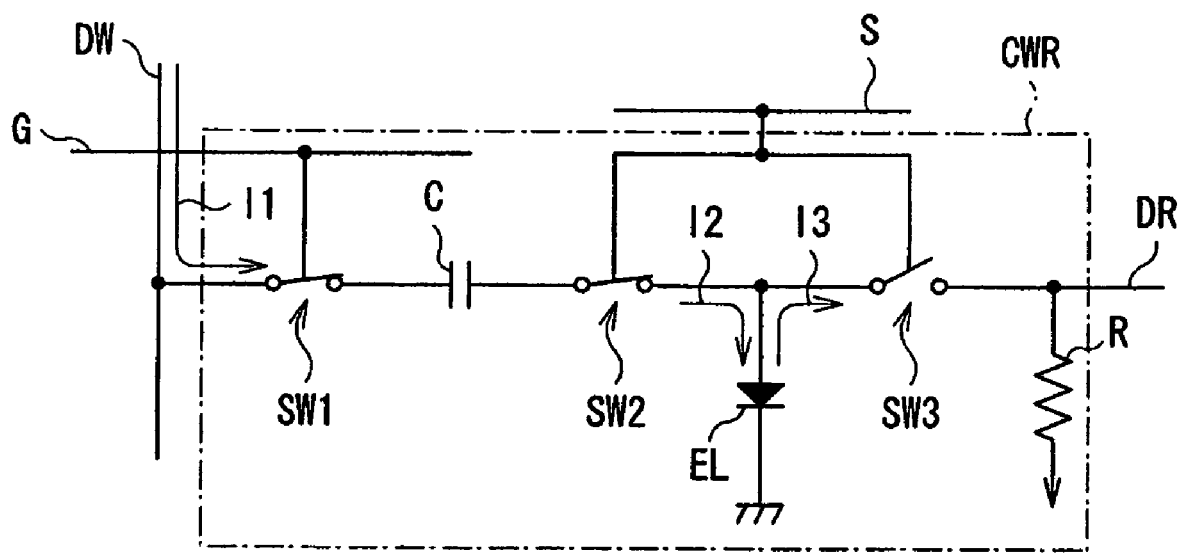
FIG. 13 is a circuit diagram showing a configuration of the light receiving and emitting cell in FIG. 12.

FIG. 13 shows a circuit configuration of the light receiving and emitting cell CWR in FIG. 12.

The light receiving and emitting cell CWR has a configuration, in which a gate line for light emitting G for selecting the light receiving and emitting device EL as a light emitting drive target, a data feed line DW for feeding data for display to the light receiving and emitting device EL, a switch line S for switching light emitting drive and light receiving drive for the light receiving and emitting device EL, and a data reading line DR for reading a light receiving signal from the light receiving and emitting device EL are respectively connected. That is, compared to the cell of 1 pixel including an ordinary light emitting device, in this configuration, one gate line and one data line are additionally included for light receiving. Further, the light receiving and emitting cell CWR has a light receiving and emitting device EL, a capacitor C, a resistance R, a first switch SW1 for selectively providing conduction between the data feed line DW and an end of the capacitor C according to a selection signal fed from the gate line for light emitting G, a second switch SW2 for selectively providing conduction between the other end of the capacitor and an end of the light receiving and emitting device EL according to a switch signal fed from the switch line S, and a third switch SW3 for selectively providing conduction between an end of the light receiving and emitting device EL and the data reading line DR according to the switch signal fed from the switch line S as well. The other end of the light receiving and emitting device EL is connected to ground. An end of the resistance R is connected to the data reading line DR, and the other end of the resistance R is connected to earth, or connected to a negative bias point (not shown).

Here, descriptions will be specifically and simply given of the light receiving and emitting cell during light emitting operation and light receiving operation. Light emitting operation and light receiving operation are preformed by utilizing characteristics of the light receiving and emitting device EL as follows. That is, the organic EL device constructed as a light receiving and emitting device in the example of FIG. 13, an LED device and the like have characteristics that light emitting operation occurs when a forward bias voltage is applied, and light receiving occurs to generate a current when a backward bias voltage is applied. Therefore, this light receiving and emitting device EL is not able to perform light emitting operation and light receiving operation concurrently. It is necessary to adopt time division operation for performing both operations.

In light emitting operation, as described above, according to the selection signal fed from the gate line for light emitting G and the switch signal fed from the switch line S, the first switch SW1 and the second switch SW2 become ON state and the third switch SW3 becomes OFF state. Concurrently, a forward bias voltage is applied to the light receiving and emitting device EL. Here, in order to obtain light emitting with luminance corresponding to the display signal, the capacitor C is charged from the data feed line DW via a path I1, and accordingly a current is applied to the light receiving and emitting device EL via a path I2, and thereby light emitting operation is performed.

Meanwhile, in light receiving operation, as described above, according to the switch signal fed from the switch line S, the second switch becomes OFF state, and the third switch SW3 becomes ON state. Concurrently, a backward bias voltage is applied to the light receiving and emitting device EL. A current corresponding to a light volume received in the light receiving and emitting device EL is fed to the data reading line DR via a path I3, and thereby light receiving operation is performed. When both light emitting operation and light receiving operation are not performed, the first switch SW1, the second switch SW2, and the third switch SW3 are all in OFF state, and the data feed line DW and the data reading line DR are respectively disconnected from the light receiving and emitting device EL. The resistance R connected to the data reading line DR has a function to generate potential difference between the both ends of the resistance R based on the current fed to the data reading line DR via the path I3 as described above, and output the potential difference as a light receiving signal.

According to this modified example, by controlling as above, each pixel in the light receiving and emitting section 31 can perform light emitting operation and light receiving operation.

In this case, based on the result of specifying the light receiving position of the symbol detected as described above, it is possible to determine the display position for displaying the two-dimensional dynamic code in the display apparatus 1 on the contrary.

It should be understood by those skilled in the art that various modifications, combinations, sub-combinations and alternations may occur depending on design requirements and other factors insofar as they are within the scope of the appended claims or the equivalents thereof.

What is claimed is:

1. A communication method performed between a display apparatus having a display screen capable of displaying moving pictures and a light receiving apparatus having a light receiving means capable of receiving light by using a two-dimensional dynamic code which is a two-dimensional code changing along a time axis, the communication method comprising the steps of:

configuring the two-dimensional dynamic code so as to include a plurality of symbols, the symbols including a data symbol which is a two-dimensional code expressed with a format for data transmission, and an anchor symbol which is a two-dimensional code expressed with a format for anchor transmission; and displaying the data symbol on the display screen in the display apparatus, along the time axis, while displaying the anchor symbol on the display screen every time the data symbol is displayed once or a plurality of times, wherein:

the two-dimensional dynamic code further includes a synchronous symbol which is a two-dimensional code expressed with a format for synchronization and a header symbol which is a two-dimensional code expressed with a format for header;

in the display apparatus, before the data symbol and the anchor symbol are displayed, the synchronous symbol and the header symbol are displayed on the display screen; and in the light receiving apparatus, before the data symbol and the anchor symbol are read, the synchronous symbol and the header symbol are read by the light receiving means.

2. A communication method according to claim 1, wherein in the light receiving apparatus, at least one of a start point of communication by the two-dimensional dynamic code and the light receiving position in the light receiving means is specified based on the synchronous symbol read by the light receiving means.

3. A communication method according to claim 1, wherein in the light receiving apparatus, the total number of anchor symbols subsequently displayed in the display apparatus is specified based on the header symbol read by the light receiving means.

4. A communication method according to claim 3, wherein in the light receiving apparatus, a data type of the data symbol is further specified based on the header symbol read by the light receiving means.

5. A display apparatus performing communication with a light receiving apparatus by using a two-dimensional dynamic code which is a two-dimensional code changing along a time axis, the display apparatus comprising:

a display screen capable of displaying video;

a generation means for generating the two-dimensional dynamic code including a plurality of symbols, the symbols including a data symbol which is a two-dimensional code expressed with a format for data transmission to the light receiving apparatus, and an anchor symbol which is a two-dimensional code expressed with a format for anchor transmission; and a display control means for sequentially displaying the data symbols in the two-dimensional dynamic code generated by the generation means along a time axis on the display screen, and for displaying the anchor symbol on the display screen every time the data symbol is displayed once or a plurality of times, wherein the generation means generates the two-dimensional dynamic code further including a synchronous symbol which is a two-dimensional code expressed with a format for synchronization, and a header symbol which is a two-dimensional code expressed with a format for header, and the display control means displays the synchronous symbol and the header symbol before displaying the data symbol and the anchor symbol.

6. A light receiving apparatus performing communication with a display apparatus having a display screen by using a two-dimensional dynamic code which is a two-dimensional code changing along a time axis, the light receiving apparatus comprising:

a light receiving means for reading the two-dimensional dynamic code including a plurality of symbols from a display screen of the display apparatus, the symbols including a data symbol which is a two-dimensional code expressed with a format for data transmission, and an anchor symbol which is a two-dimensional code expressed with a format for anchor transmission; and a specifying means for detecting the anchor symbol from the two-dimensional dynamic code read by the light receiving means, and specifying a light receiving position in the light receiving means based on the detected anchor symbol, wherein in the display apparatus, when the synchronous symbol which is the two-dimensional code expressed with the format for synchronization, and the header symbol which is the two-dimensional code expressed with the format for header are displayed before the data symbol and the anchor symbol are displayed, the light receiving means reads the synchronous symbol and the header symbol before reading the data symbol and the anchor symbol.

7. A light receiving apparatus according to claim 6, wherein the specifying means specifies at least one of a start point of the communication by the two-dimensional dynamic code and the light receiving position in the light receiving means based on the read synchronous symbol.

8. A light receiving apparatus according to claim 6, wherein the specifying means specifies the total number of anchor symbols subsequently displayed in the display apparatus based on the read header symbol.

9. A light receiving apparatus according to claim 8, wherein the specifying means further specifies a data type of the data symbol based on the read header symbol.

* * * * *